Sept. 8, 1970 G. B. YNTEMA 3,528,001
TEST CELL FOR MEASURING THE MAGNETIC PROPERTIES
OF CRYOGENIC MATERIALS
Filed Nov. 9, 1967 2 Sheets-Sheet 1

INVENTOR
GEORGE B. YNTEMA
BY Melvin Pearson Williams
ATTORNEY

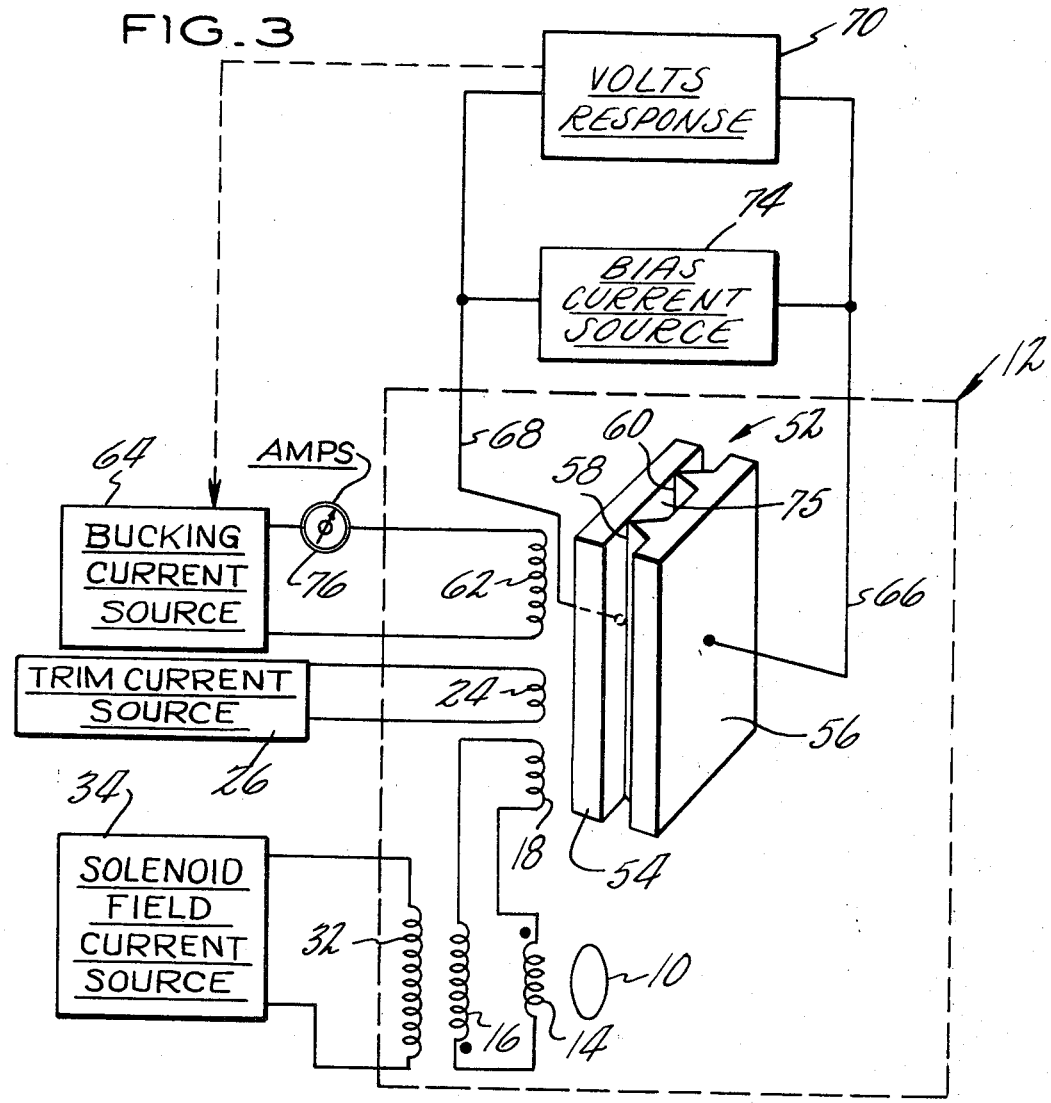
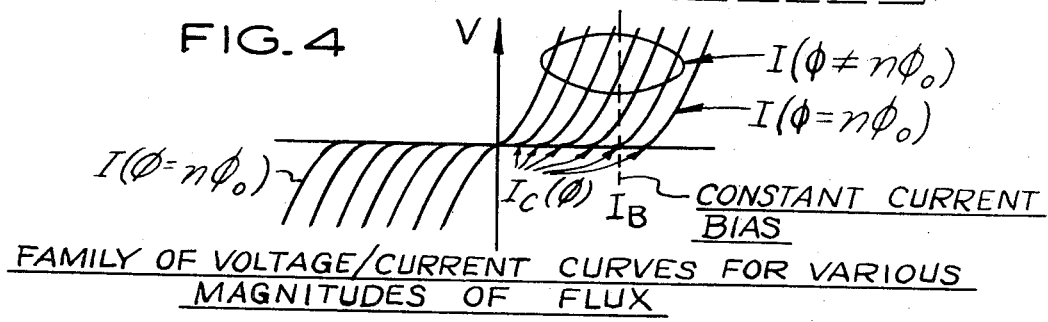
FAMILY OF VOLTAGE/CURRENT CURVES FOR VARIOUS MAGNITUDES OF FLUX
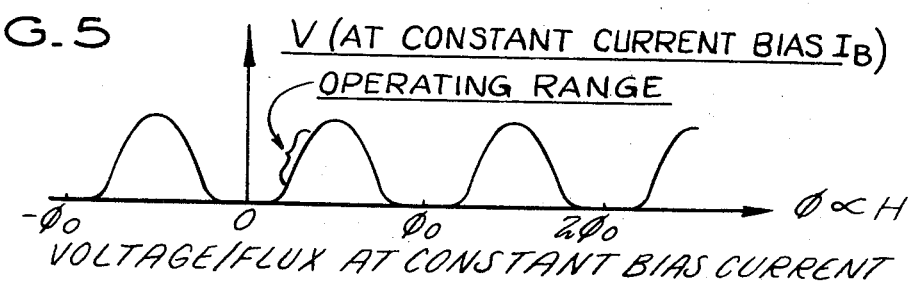
VOLTAGE/FLUX AT CONSTANT BIAS CURRENT United States Patent Office 3,528,001
Patented Sept. 8, 1970

3,528,001
TEST CELL FOR MEASURING THE MAGNETIC PROPERTIES OF CRYOGENIC MATERIALS
George B. Yntema, Bolton, Conn., assignor to United Aircraft Corporation, East Hartford, Conn., a corporation of Delaware
Filed Nov. 9, 1967, Ser. No. 681,640
Int. Cl. G01r 33/12
U.S. Cl. 324—34                                   4 Claims

ABSTRACT OF THE DISCLOSURE

A cryostat for measuring the magnetic moment of a sample includes concentric, serially-opposed super-conducting sensing windings in a field of a solenoid, into which the sample may be placed. The magnetic effect of the sample is measured by either a super-conducting transformer rendered magnetically responsive by the heating of its core, or by a pair of Josephson tunnel junctions in a superconducting coil. Either embodiment of measuring device is connected to the series opposed pair of coils and is therefore responsive to currents induced therein by the magnetic moment of the sample.

BACKGROUND OF THE INVENTION

Field of invention

This invention relates to measuring the magnetic properties of cryogenic materials, and more particularly to a magnetically responsive test cell, and related equipment therefor.

Description of the prior art

In order to measure the various magnetic properties (such as susceptance, reluctance, retentivity, etc.) of materials in a superconducting state, or of materials at differing cold temperatures, it is necessary to provide a suitable environment for making the magnetic tests at very cold temperatures. Moreover, the currents which are indicative of flux in the test cell must be measured in some fashion that will not cause feedback of the measuring equipment responses into the sample, which feedback otherwise could distort the measurements being made. The use of superconducting currents in such a test cell makes possible measuring techniques for which ordinary measuring equipment is not suitable.

SUMMARY OF INVENTION

An object of the invention is to provide a cryogenic magnetic measuring device having a controlled magnetic environment for the material under test.

Another object of the invention is to provide apparatus capable of operating at superconducting temperatures for the measurement of magnetic effects of a sample in a test cell.

In accordance with the present invention, a device for performing the measurements of magnetic properties of superconducting materials includes a solenoid capable of subjecting the material to be tested to controlled magnetic fields, in combination with a magnetically responsive means for sensing the effect of the magnetic field upon the medium under test, said means, however, being insensitive to the raw effect of the magnetic field itself. In an exemplary form, the measuring device in accordance herewith comprises: two serially connected magnetic coils, one positioned inside the other, the coils being wound in an opposite sense or polarity, both coils being placed within the influence of a strong magnetic field, such as may be produced by a solenoid. The inner magnetic coil has more turns than the outer coil, but each turn of the outer coil, being larger, is more strongly influenced by the magnetic field produced by the solenoid than is a turn of the inner coil so that the serial raw magnetic effect of the solenoid cancels out in the two coils. However, a magnetic sample placed inside the inner coil will affect the current flowing in the coils to a greater extent by its influence on the inner coil than by its opposite influence on the outer coil, because the inner coil is closer to the magnetic sample and has more turns than the outer coil. Thus, there is a net effect upon the serially-opposed pair of coils as a result of the magnetic behavior of the sample but not as a direct result of the magnetic field that operates upon the sample.

The effect of the magnetic influences in the sample under test which is reflected in the serially-opposed pair of coils is measured externally of the coils by some suitable measuring apparatus, of which a pair of exemplary embodiments are included herein. In the first of these embodiments, a third coil is connected in series with the serially-opposed pair, and the current in the three coils is measured by changing the reluctance in the coupling between the third coil and a fourth coil, and measuring the effect which occurs in the fourth coil as a result of this change. In a second embodiment, a pair of Josephson tunnel junctions are used as a sensing device in order to develop a current which is proportional to the magnetic moment of the sample under test.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 3 is a schematic diagram of a second embodiment of the invention utilizing a pair of Josephson tunnel junctions as a measuring device;

FIG. 4 is a plot of voltage versus current for various magnitudes of flux in the embodiment of FIG. 3;

FIG. 5 is a plot of voltage versus magnetic field or flux within the Josephson tunnel junction device utilized in the embodiment of FIG. 3 when adjusted in accordance with the present invention.

DESCRIPTION OF THE PREFERRED EMBODIMENT

As described hereinbefore, a test cell in accordance with the present invention is preferably comprised of a plurality of coaxially disposed coils. However, for simplicity in describing the interconnection of the apparatus in accordance herewith, the circuits are represented schematically.

Figure 1:
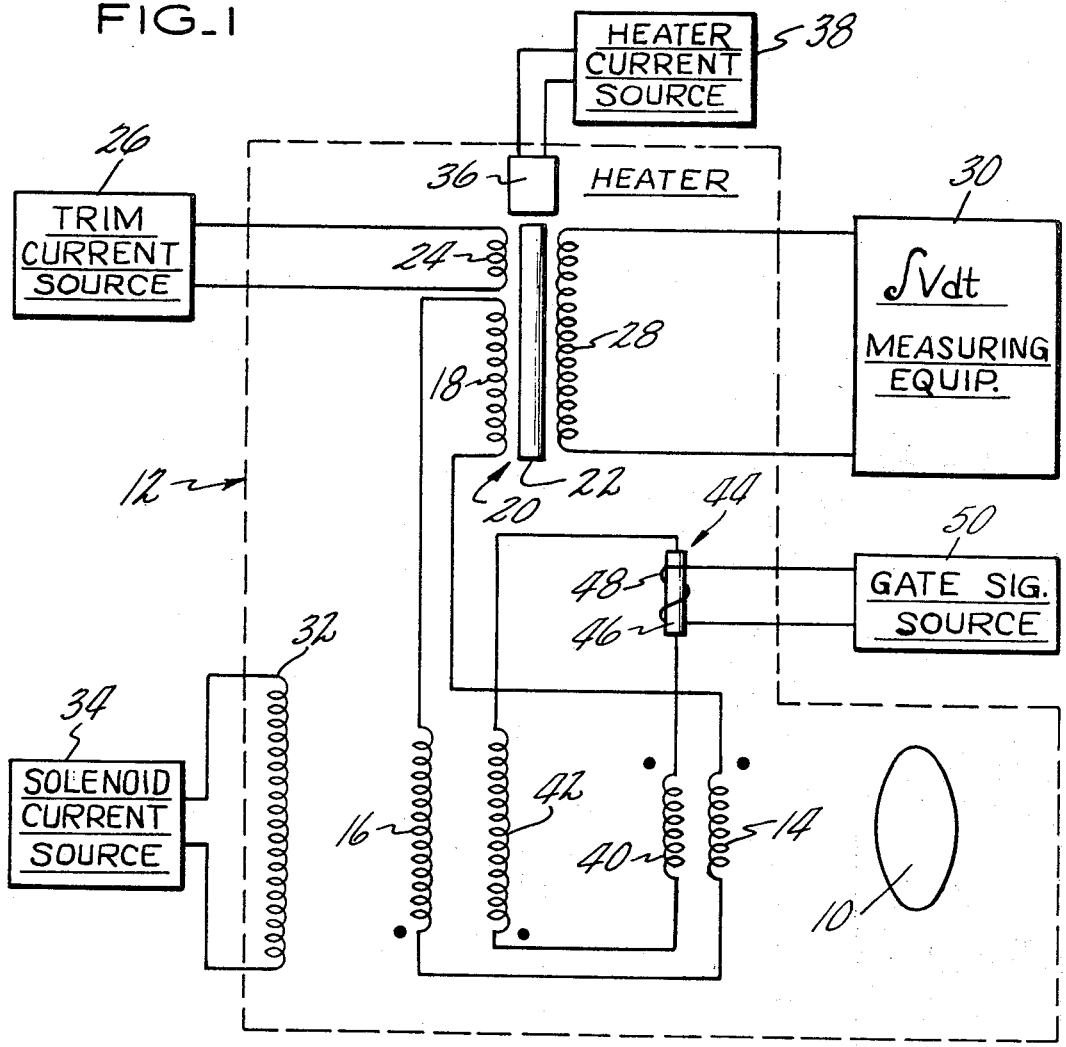
FIG. 1 is a schematic diagram of a first embodiment of the invention utilizing a superconducting transformer with a selectively heated core as a measuring device.

Referring now to FIG. 1, a sample 10 is placed within a cryostat 12 within which all of the elements are cooled so that some of them as indicated below become superconducting and thus capable of conducting persisting currents. Surrounding the sample 10 is a coil 14 which is serially connected with an oppositely wound coaxial coil 16, which in turn is connected to a primary winding 18 of a transformer 20. The coils 14 and 16 may preferably comprise an alloy of niobium (sometimes referred to as columbium) and zirconium. The coil 18 is preferably composed of niobium. An important consideration in the selection of material for each of these coils is that it must remain superconducting and not exhibit "flux creep" at the temperature and magnetic field strength at which it is used. The transformer 20 includes a core 22 which is preferably composed of tantalum, and includes a trimming coil 24 which is attached to a source 26 of trim current. Transformer 20 also includes a secondary winding 28 which is connected to equipment for measuring the integral of voltage with respect to time. Such equipment may comprise an integrating voltmeter, or other suitable equipment known to the prior art. The sample 10, and the coaxially disposed coils 14, 16 are all surrounded by a strong solenoid 32 which is energised by a source of solenoid current 34.

It is well known in the prior art that superconducting materials such as the core 22 of the transformer 20 are capable of blocking magnetic flux, so that the core 22 partially shields the primaries 18, 24 from the secondary 28 of the transformer 20 when the core is in a superconducting condition. A heater 36, together with a source 38 of electric current, is utilized when required to raise the temperature of the core 22 to a sufficiently high temperature so that it is no longer superconducting and thereby to increase the coupling of the transformer 20.

Although the windings 18, 24, 28 are shown in schematic form, the transformer 20 will preferably be of a concentric design whereby close coupling is achieved.

A first simple mode of operation of the embodiment shown in FIG. 1 utilizes the apparatus 10–38 in the following manner. The solenoid current source 34 may be adjusted to provide sufficient current to the solenoid 32 so as to present a suitably strong magnetic field within the test cell. The trim current source 26 may then be adjusted so as to balance out any mismatch between the coils 14 and 16 so that with the solenoid 32 supplying a magnetic field in the absence of the sample 10, the net effect of the primary windings 18, 24 of the transformer 20 will be to induce no net voltage in the secondary 28 when the reluctance of the transformer core 22 is changed. Then, the sample 10 may be inserted into the solenoid field, and its reluctance will alter the effect of the solenoid 32 on the coil 14, but will have less effect on the more remotely disposed coil 16, whereby the primary 18 will have a net current flow over and above the current flow which is compensated by the trimmer coil 24 so that as the core 22 is heated, a voltage is induced in the secondary 28, the integral of which with respect to time can be measured by measuring equipment 30.

The embodiment of FIG. 1 may also be operated in a mode in which the sample 10 is initially in place in the concentric coils 14 and 16 and remains there throughout the measurement. In this mode of operation the magnetic moment of the sample may be observed continually as the temperature and magnetic field at the sample are varied. In this mode of operation the trim current is controlled so as always to be in proportion to the solenoid current. The constant of proportionality is adjusted once and for all before the measurement, either without the sample in place or with the sample in a non-superconducting state, in which its magnetic moment is negligible. The adjustment is made so as to correct for any mismatch between the coils 14 and 16 by which mismatch the net response of the combination of these two coils to the raw field of the solenoid is different from zero.

In order to improve the operation of the embodiment of FIG. 1, means are provided to allow the establishment of a steady-state condition with the sample 10 in place and with the core 22 in its superconducting state due to lack of current applied to the heater 36, thereafter establishing suitable means to avoid feedback effects as the heater 36 is turned on so as to increase coupling of the current persisting in coil 18 through the transformer 20, thereby to induce a voltage pulse in the secondary, the measurement of which will give an indication of the magnetic moment of the sample 10. The problem is that when the transformer core is rendered non-superconducting, it, of course, will produce a change of current in the winding 18 and in windings 14 and 16 and thus perturb the environment of the sample. In order to avoid this, there is provided a superconducting winding 40 which is wound integrally with the winding 14, and a superconducting winding 42 which is wound integrally with the winding 16. These two windings 40 and 42 are series connected through a cryogenic switch 44 which includes an element 46, which is a suitable superconducting material such as tantalum, about which is wound a coil 48, which may comprise niobium. The coil 48 is fed electric current by a gate signal source 50 which provides a suitable magnetic field to render the element 46 non-superconductice.

In using this refinement, the sample 10 is placed within the cryostat 12. With the transformer core heater 36 off and with the current in the coil 48 on, the current in the solenoid 32 is adjusted to produce the magnetic field in which the magnetic moment of the sample is to be measured, and the circuit stabilizes. Then the gate signal source 50 is turned off, which removes the magnetic field from the element 46 so the element 46 allows persisting currents to flow through the coils 40, 42. This flow of persisting currents changes in such a way as to compensate for any change in current flow in the closely coupled respective coils 14, 16 so that when the heater 36 is turned on, thus perturbing the persistent current flow in coils 18, 16 and 14, no feedback effect is felt at the sample. Therefore, there is no feedback effect as a result of turning on the heater in using the transformer 20 to produce the voltage pulse which is used as a measure of the magnetic moment of the sample.

Figure 2:
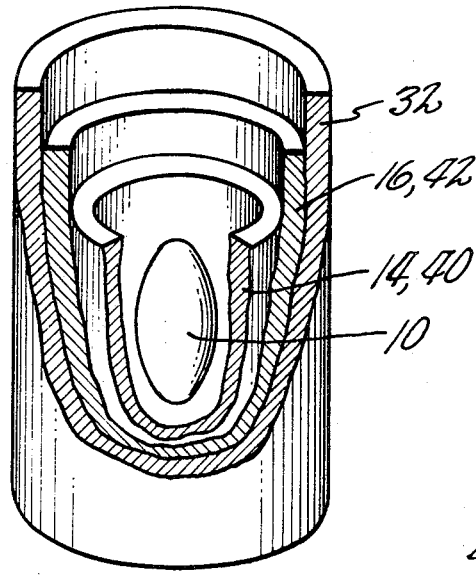
FIG. 2 is a pictorial illustration of the concentric arrangement of the coils of FIG. 1 in accordance with a preferred embodiment of the invention.

Within the cryostat 12, the test cell comprises the solenoid 32, the coils 14, 40, 16, 42. As described hereinbefore, these coils are preferably arranged concentrically within a generally cylindrical solenoid, as illustrated more clearly in FIG. 2. FIG. 2 illustrates the coils merely as cylinders, but it will be appreciated that suitably wound helices may be arranged as shown in FIG. 2 so as to provide a concentric test cell having the characteristics described hereinbefore within which a sample 10 may be placed to achieve the advantages of the present invention.

Another embodiment of the invention which avoids the feedback problem discussed hereinbefore relative to FIG. 1 is illustrated in FIG. 3. Therein, the cryostat 12 includes a concentric test cell (of the form shown in FIG. 2 except that coils 40, 42 are not needed) having a superconducting inner coil 14, a superconducting outer coil 16, and a solenoid coil 32 fed by a source of solenoid current 34. The coils 14 and 16 are serially connected with a superconducting coil 18, which is closely coupled to a trim coil 24 that is fed by source of trim current 26. All of this apparatus operates in the same fashion as is described in respect to the first mode of operation of the embodiment of FIG. 1. The measuring means in this case, however, does not include a transformer but rather a Josephson tunnel junction device 52 which includes a pair of small superconducting metallic elements 54, 56 which are pressed together at knife edges 58, 60 to produce junctions through which electrons will tunnel. For instance, the metal pieces 54, 56 may comprise niobium of which the surfaces have been allowed to oxidize; the application of oxygen or other well-known techniques may be used so as to provide the amount of oxidation necessary.

This type of a device is described more fully in a pair of articles: Physical Review Letters, "Quantum Interference Effects in Josephson Tunneling" by R. C. Jaklevic, John Lambe, A. H. Silver, and J. E. Mercereau; Physical Review Letters, "Quantum Interference from a Static Vector Potential in a Field-Free Region" by R. C. Jaklevic, J. J. Lambe, A. H. Silver, and J. E. Mercereau. The first of these is in vol. 12, No, 7 Feb. 17, 1964, at pages 159 and 160. The second of these is in vol. 12, No. 11, Mar. 16, 1964 at pages 274 and 275.

At ordinary temperatures, such a device exhibits a tunneling effect which may be catagorized as an osmosis of electrons going through the oxide (provided it is thin enough), the flow of which is proportional to the voltage across the junction (or across the oxide). However, when such a device is rendered superconducting, a current flow can pass through the oxide without any voltage being impressed across the junctions. The upper limit $I_c$ on the net amount of current which flows from one superconductor to the other through the two junctions depends on the amount of magnetic flux $\phi$ passing through the area 75 delimited by the superconductors and the junctions. Moreover, the entire relation between net current I and voltage difference V is known to depend on $\phi$ as a parameter as is shown qualitatively (for small voltage differences) in FIG. 4. The dependence is repetitious, being the same for any integral multiple $n$ of a natural unit of flux $\phi_0$ as it is for zero flux. This natural unit of flux is very small. It is commonly called the "flux quantum" and is well known in the superconducting art.

A common method of using a pair of Josephson tunnel junctions to measure flux is to maintain a constant net current flow from one of the superconducting pieces to the other through the two junctions. This constant bias current $I_B$ is small enough so that there are some values of $\phi$ at which the voltage difference V between the two pieces of superconductor is zero. At such a constant current bias the voltage difference depends on flux in a periodic fashion as is shown qualitatively in FIG. 5. Because this dependence is repetitious, it is advantageous to restrict $\phi$ to a narrow range to avoid ambiguity. This restriction is achieved by means of current in a bucking coil 62, which current is provided by a bucking current source 64. The flux $\phi$ is the sum of contributions from the coil 18 and from the bucking coil 62. A negative feedback system is used so that the bucking current source 64 is regulated by the voltage difference V in such a way that $\phi$ stays always in the chosen operating range. Suitable feedback control systems are known to the prior art. The magnitude of the current in the bucking coil 62 is read on a suitable ammeter 76 and is a measure of the magnetic moment of the sample 10 so long as the flux $\phi$ is held in the narrow operating range as indicated in FIG. 5.

Figure 6:
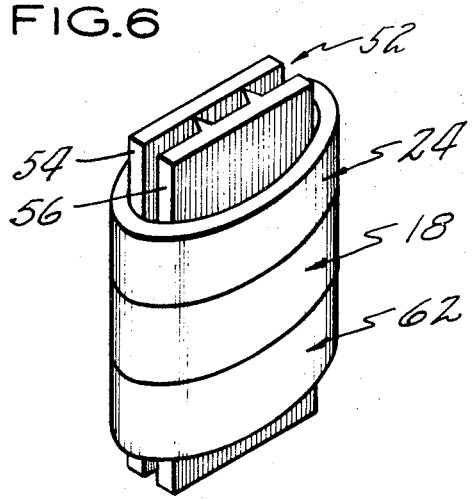
FIG. 6 is a pictorial illustration of the concentric arrangement of the Josephson tunnel junction device in accordance with the embodiment of FIG. 3.

For use of the Josephson tunnel junction device 52 current is coupled to it by suitable leads 66, 68 across which there is connected a voltage-responsive controller 70. In series with the leads 66, 68 is a bias current source 74. Although the coils 18, 24, 62 are shown schematically in FIG. 3, in order for the flux to pass through the area 75 of the device 52, these coils should be arranged concentrically about the device 52, as shown in FIG. 6.

Operation of the device is best understood with references to FIGS. 3, 4 and 5. As shown in FIG. 4, the characteristics of the device 52 include a family of voltage-current curves for different amounts of flux $\phi$ passing through the area 75 of the device 52. The bias current source 74 is adjusted to provide a constant bias current $I_B$ through the device which is less than the maximum current that the device will sustain with zero voltage. Thereafter, a small increase in flux will cause a voltage difference V which is detected by the voltage responsive controller 70 which governs the magnitude of bucking current supplied by the bucking current source 64 and therefore the flux within the area 75 which is induced therein by the coil 18 as a result of currents established in coil 14 will cause a proportional change in current in the bucking coil 62. The reading of the ammeter 76 is therefore a measure of the magnetic moment of the sample 10. The geometry of the coils 18, 62 and the Josephson device 52 may preferably be arranged so that currents in the coil 18 and in the trim coil 62 each contribute flux through the device 52 but so that current in coil 62 is not appreciably coupled magnetically to coil 18. With such an arrangement, there is no feedback to the test cell 14, 16, 32, and, therefore, there is no need for additional equipment such as windings 40, 42 as shown in FIG. 1, to mitigate feedback effects.

It should be understood that one of the basic principles of the present invention is provision of the test cell which may include coils 14, 16 and 32 as described hereinbefore, and may also include feedback reducing coils 40, 42 as described. Another aspect of the present invention is provision of a transformer type of measuring apparatus. Another feature is the utilization of a gate signal source to maintain constant currents during the testing of the sample as described relative to the second mode of operation of the embodiment of FIG. 1. A further aspect is the utilization of the Josephson tunnel junction device, which avoids feedback problems, as described with respect to the embodiment of FIG. 3.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of my invention, that which I claim as new and desire to secure by Letters Patent of the United States is:

1. A magnetic moment test cell comprising:
   a pair of serially opposed concentric superconducting coils, one coil positioned coaxially inside the other;
   a source of magnetic flux, said source so oriented and disposed so as to have a substantially equal effect upon each of said pair of coils, whereby there is substantially no magnetic effect upon the net series circuit of said pair of coils;
   a superconducting coil serially connected with said pair of coils, said coil being helically wound in the form of a solenoid;
   a bucking coil which is magnetically coupled to said superconducting coil;
   means including a Josephson double tunnel junction device responsive to the current in said superconducting coil for providing an indication thereof, said means including current adjusting apparatus and voltage sensing apparatus for said Josephson device, whereby variations in voltage across said Josephson device are sensed as they are produced by variations in flux impressed thereon by said superconducting coil under the condition of constant bias current passing through said Josephson device, said voltage sensing apparatus also controlling the current through said bucking coil.

2. A magnetic moment test cell comprising:
   a pair of serially opposed concentric superconducting coils, one coil positioned coaxially inside the other;
   a source of magnetic flux, said source so oriented and disposed so as to have a substantially equal effect upon each of said pair of coils, whereby there is substantially no magnetic effect upon the net series circuit of said pair of coils;
   a first superconducting coil serially connected with said pair of coils, said coil being helically wound in the form of a solenoid;
   a second superconducting coil coupled to said first superconducting coil through a superconducting transformer, said transformer having a heating element attached to its core so that it may be selectively rendered capable of transmitting magnetic flux from said first coil to said second coil; and
   means for sensing currents induced in said pair of coils including means responsive to said second coil for indicating the integral of voltage with respect to time in said second coil resulting from selectively rendering said transformer capable of transformer action.

3. A magnetic moment test cell comprising:
   a first pair of serially opposed concentric superconducting coils, one coil positioned coaxially inside the other;

a source of magnetic flux, said source so oriented and disposed so as to have a substantially equal effect upon each of said first pair of coils, whereby there is substantially no magnetic effect upon the net series circuit of said first pair of coils;

a selectively superconducting switching means;

a second pair of series-opposed superconducting coils, one corresponding to and wound in close coupling with each of said coils in said first pair, said coils being connected in series-opposed relationship and in serially relation with said switching means, said coils with current flowing therein as a result of said switching means being placed in a superconducting condition, effectively cancelling the magnetic effects and any change of current in said first pair of coils; and means for sensing currents induced in said first pair of coils.

4. The magnetic moment test cell according to claim 3 wherein said switching means includes a magnetically wound cryotron, including a source of current for the winding thereon, current passing through said winding causing a magnetic field to block the passage of supercurrent through said pair of coils, said switching means being a superconductive condition in the absence of current applied to the coil thereof.

References Cited

UNITED STATES PATENTS

| | | | |
|---|---|---|---|
| 2,034,502 | 3/1936 | Zuschlag | 324—34 |
| 2,555,853 | 6/1951 | Irwin | 324—34 |
| 3,281,668 | 10/1966 | Rosner et al. | 324—40 |
| 3,363,200 | 1/1968 | Jaklevic et al. | 307—306 XR |
| 3,423,607 | 1/1969 | Kunzler et al. | 307—306 |

OTHER REFERENCES

McKim and Wolf: "Jour. Sci. Instr.," February 1957, pp. 64–67.

Maxwell: "Rev. Sci. Instr.," vol. 36, No. 34; April 1965.

ALFRED E. SMITH, Primary Examiner

U.S. Cl. X.R.

324—40